Figure 5:
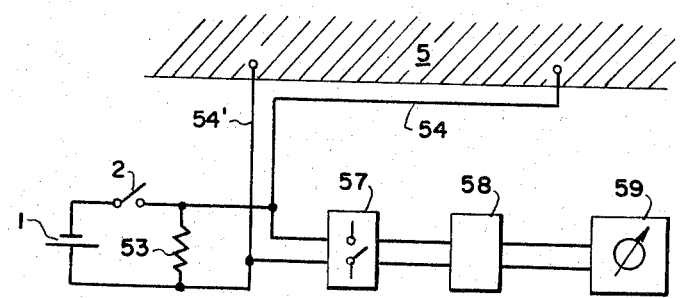

April 18, 1967 C. COLANI 3,315,155
METHOD AND APPARATUS FOR INVESTIGATING A GENERALLY
HOMOGENEOUS MEDIUM AS TO REGIONS OF ANOMALOUS
ELECTRICAL CONDUCTIVITY
Filed April 30, 1963 2 Sheets-Sheet 1
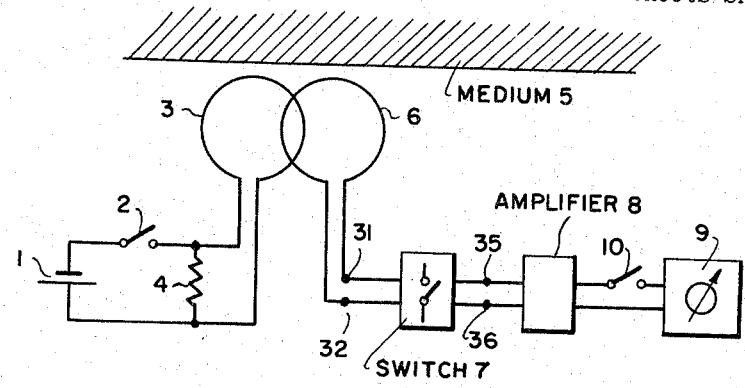
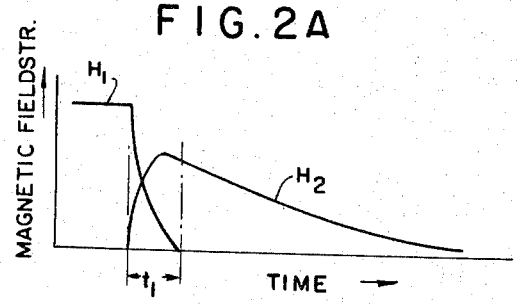
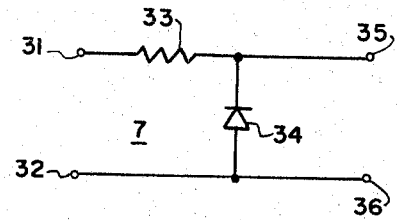
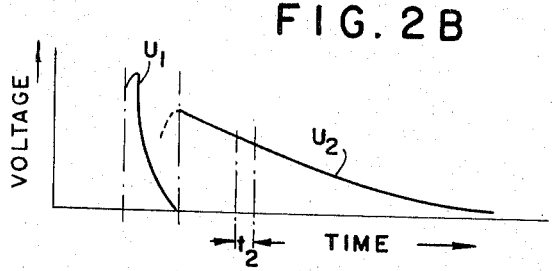
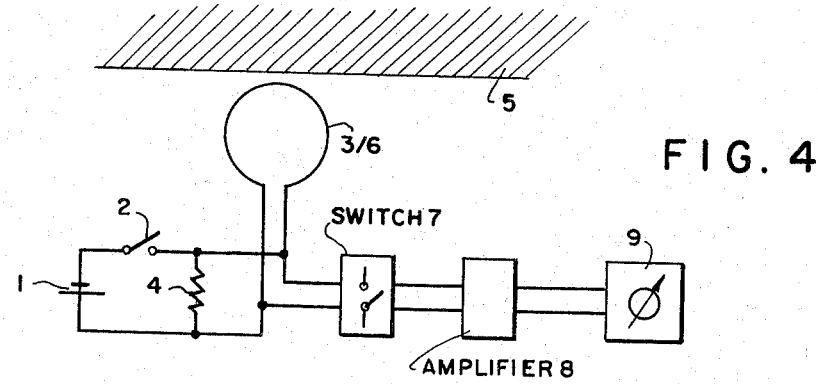

United States Patent Office 3,315,155
Patented Apr. 18, 1967

3,315,155
METHOD AND APPARATUS FOR INVESTIGATING A GENERALLY HOMOGENEOUS MEDIUM AS TO REGIONS OF ANOMALOUS ELECTRICAL CONDUCTIVITY
Claus Colani, Brehmstrasse 20, Munich, Germany
Filed Apr. 30, 1963, Ser. No. 277,417
Claims priority, application Germany, Feb. 18, 1963, C 29,188
5 Claims. (Cl. 324—40)

The present invention concerns a method for the investigation of relatively homogeneous media with respect to zones of anomalous or varying electric conductivity. Furthermore the invention concerns suitable devices based on the method of the present invention.

There are various possibilities for discovering or locating inhomogeneities, for example inclusions, in voluminous media which may show a certain electric conductivity. If the medium is transparent or at least permeable by X-rays, inhomogeneities with respect to electric conductivity may be detected by optical or quasi-optical procedures. In cases where such procedures are not practicable it is possible as a rule to investigate by mechanically dividing or dissecting the medium into relatively small parts. These parts may then be electrically tested with respect to their conductivity unless their visual appearance alone permits the elimination of those parts showing inhomogeneities.

It is an object of the present invention primarily to provide means for a rough localization of inhomogeneities within a medium that may be very extended, such inhomogeneities being zones of anomalous electric conductivity compared to the rest of the medium.

This object is achieved by employing the principle embodied in my invention, according to which a magnetic field, penetrating a part or all of the medium under test, is built up for a definite time, and during its rise and decay time causes eddy currents within the medium and in any inhomogeneities or zones of anomalous electric conductivity of the medium, so that a resulting magnetic field can be defined, consisting of the primary field and the field of the eddy currents. This resulting field, namely its rise and/or decay time, is measured and compared with the corresponding times of an absolutely homogeneous medium.

A preferred device, utilizing the principle of the invention, consists of a conductive loop that encircles the area to be tested and is fed by a generator, producing a current of an exactly defined time curve with respect to time. In addition this device incorporates a measuring unit that is connected to the above mentioned loop, or a separate loop, and serves to determine the rise and/or decay time of the resulting magnetic field. The generator will, preferably, produce a current with an amplitude describing a step-function, for example a square-wave pulse, with a length and repetition interval considerably exceeding the rise or decay time of the resulting magnetic field. Furthermore it is advisable to provide a protective gate or lock, hereinafter called "protective switch," for either short-circuiting or opening preferably the input of the measuring unit during the rise and/or decay time of the primary magnetic field. It may also be useful to provide a cathode-ray oscilloscope or an analyzing network based on the sampling-principle as output indicator of the measuring unit.

As investigations have shown, the method of the invention is suited not only to rough examinations of an extended medium by means of a relatively large loop, but it is also usable in investigations of finer structures, provided the diameter of the loop is suitably reduced. The conductive loop or loops may definitely encircle the whole medium under test. But in many cases it may be sufficient to place them on the surface of the medium. If the medium is liquid, doughlike or powdery, the loops may be embedded or immersed. If the electric conductivity of the medium is sufficiently high, for example similar to the conductivity of sea water, the loop or loops can be reduced to elongated conductors and the return path of the current then extends from the end of the conductors through the medium itself by galvanic or capacitive contact.

Figure 6:
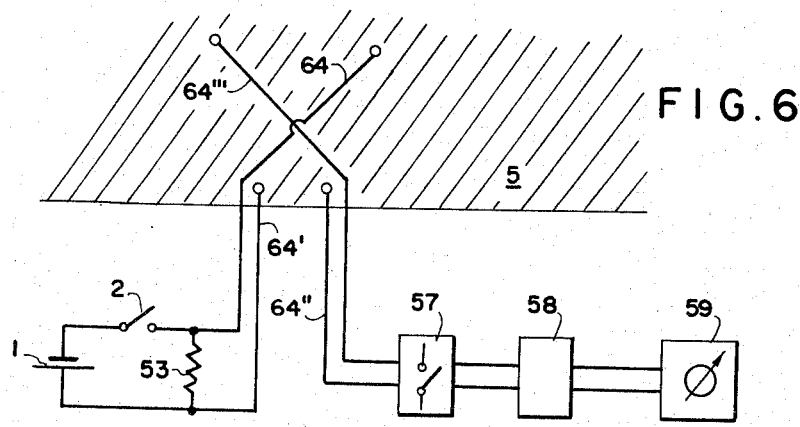
Figure 7:
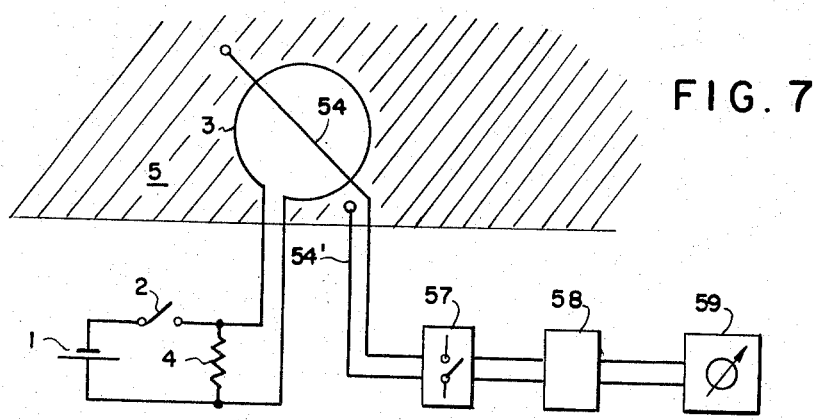

These and other features of the present invention will be more readily apparent from the following detailed description, taken in conjunction with the accompanying drawings, in which:

FIG. 1 is a schematic diagram of an illustrative embodiment of the invention to demonstrate the general idea, FIG. 2A is a graph which shows the curve with respect to time of the respective magnetic field strengths with the conductive loops, FIG. 2B is a graph that depicts the curve with respect to time of voltages induced at the terminals of the conductive loops, FIG. 3 shows a circuit diagram of a very simple protective switch, FIG. 4 is a schematic diagram of a simplified embodiment of the invention, similar to FIG. 1, FIG. 5 is a schematic diagram of another embodiment of the invention where an elongated conductor is used instead of a loop, FIG. 6 represents the schematic diagram of another similar embodiment of the invention with separate generator and receiver circuits, using two elongated conductors; and FIG. 7 shows the schematic diagram of an embodiment with one loop and one elongated conductor.

In all figures like numerals refer to like parts throughout.

Turning now to the drawings, FIG. 1 shows a schematic diagram of a simple embodiment of the invention wherein the primary circuit consists of a direct-current source 1, a switch 2, a conductive loop or coil 3 and damping resistor 4. The closing of switch 2 causes a current to flow through loop 3 so that a magnetic field $H_1$ builds up and spreads through the possibly conductive medium 5. When switch 2 is opened, the magnetic field $H_1$ (FIG. 2A) decays with a time constant $T_1$ which depends upon the resistance R of resistor 4 and the inductivity L of loop 3: $T_1 = L/R$. The decaying magnetic field induces within medium 5 and/or its inhomogeneities a current $I_2$ that decays according to the conductivity and geometry of all possible current paths. This decay is characterized with excellent approximation by one or a sum of $e$-functions with one or several time constants $T_2, T_3 \ldots T_n$. These time constants are the wanted data, since they depend entirely on the electric characteristics of the medium and any inhomogeneities thereof. The measurement is carried out through loop 6 of the secondary circuit. This loop is penetrated by the magnetic field $H_1$ of loop 3, as well as by the magnetic field $H_2$ of current $I_2$ in medium 5. This produces at the terminals of loop 6 a total voltage U proportional to the temporal variation of both fields $H_1$ and $H_2$. The components of total voltage U corresponding to the magnetic fields $H_1$ and $H_2$ are here called $U_1$ and $U_2$ (FIG. 2B) respectively, so that total voltage U with respect to time $t$ is: $U = U_1 \cdot e^{-t/T_1} + U_2(t)$.

$U_1$ naturally is much greater than $U_2$. The primary circuit shall be so dimensioned that the primary time constant $T_1$ is much smaller than the smallest of the essential time constants $T_2 \ldots T_n$.

$U_1$ then decays much more rapidly than $U_2$ and can be neglected after a certain time, here called the transition period $\Delta t_1$ (FIG. 2B). After that period, substantially only the voltage $U_2(t)$ is measured at the terminals of loop 6. This can be done by any known method, for example, by means of a cathode ray oscilloscope.

The above described interrelated functions are shown in the graph of FIG. 2 for the simplest case where current $I_2$ in medium 5 decays with but one time constant $T_2$ and the result reads $$U_2(t) = U_2 \cdot e^{-t/T_2}$$

In the embodiment of the invention shown in FIG. 1, loop 6 is followed by a protective switch 7. This switch 7 decouples the input of amplifier 8 from the terminals of loop 6 during transition period $\Delta t_1$. This serves to avoid overloading of the input of amplifier 8 by the possibly very high voltage $U_1$. Furthermore it is thus assured that practically only the wanted voltage $U_2(t)$ reaches the amplifier. Generally, the protective switch 7 is an electronic device containing, for instance, electron tubes or fast semiconductors, since very short switching times, $10^{-7} \ldots 10^{-8}$ seconds, may be required for the detection of inhomogeneities.

As an example FIG. 3 shows the diagram of a circuit in which the function of protective switch 7 is accomplished in a particularly simple manner using a diode. The input terminals 31, 32 of the circuit are connected to loop 6 of FIG. 1, so that loop voltage U reaches the diode 34 via resistor 33. The diode 34 is biased in the forward direction and, together with resistor 33, functions as a known voltage limiter. This means that the potential across the diode and, at the same time, across the output terminals 35, 36 cannot materially exceed the diode gate voltage of approximately 0.5 v. Therefore voltage $U_1$, when too high, is "cut off," while voltages lower than 0.5 v., essentially $U_2$ after the transition time $\Delta t_1$ can pass without being affected by the diode.

It is to be appreciated that switch 7 prevents any signal from reaching amplifier 8 as long as the amplitude of such signal exceeds a chosen value. Consequently, switch 7 is closed only after the primary pulse has decayed during the transition time $t_1$ (FIG. 2A). Consequently, switch 7 not only protects amplifier 8 from being overloaded during the period of such primary pulse but also functions to initiate the measuring operation after the primary pulse is substantially terminated.

Receiver 8 in the embodiment shown in FIG. 1 is followed by an indicator 9, for instance a cathode ray oscilloscope. The curve of $U_2(t)$ can be seen on its screen and analyzed by visual or graphic means. Instead of a cathode ray oscilloscope other known indicating instruments may be used, for instance an indicator based on the sampling principle.

The term "sampling principle" shall be understood to mean that the indicating instrument will not show the whole curve of $U_2(t)$ from the beginning to the practical end of its decay time, but only a "sample" or fraction of the amplitude during a very short interval ($\Delta t_2$ in FIG. 2B). This one sample gives a somewhat rough indication with an all-or-none character. For a more detailed analysis of $U_2(t)$ several "samples" must be taken at different, known times and compared with each other. The advantage of the described principle is that it frequently permits separation of disturbing effects from the wanted signal. A further advantage is that it can be accomplished by very simple means. The simplest mode is a switch, as shown at 10 in FIG. 1, that connects amplifier 8 with indicator 9 during the sampling interval $\Delta t_2$ or several such intervals. Indicator 9 may store the measured results and display them by means of a pointer instrument.

As mentioned above, loops 3 and 6 can be combined into one simultaneous "transceiver" loop, thus simplifying the arrangement of FIG. 1 to that of FIG. 4. The simultaneous "transceiver" loop is numbered 3/6. Further it was stated that, if the conductivity of the medium to be examined is sufficiently high, for instance similar to that of sea water, the loop or loops can be reduced to elongated conductors insulated from the medium, and the current returns from the end of the conductors through the medium itself by galvanic or capacitive contact. Such an arrangement is shown in FIG. 5.

The primary circuit consists of direct current source 1, switch 2, damping resistor 53, elongated conductor 54, return conductor 54' and test medium 5. When switch 2 is closed, a current flows through conductors 54, 54' and medium 5, and a magnetic field is built up that spreads through medium 5. Corresponding to the processes described in explanation of FIG. 1, a secondary current is induced within medium 5 when switch 2 is opened. This secondary current causes a voltage drop that is measured over resistor 53 by means of measuring device 57, 58 and represents the wanted data, analogous to output voltage U of loop 6 in FIG. 1, since it depends entirely upon the qualities of the medium 5 and any inhomogeneities thereof. The measuring device consists of a protective switch 57, that protects amplifier 58 from high voltage pulse overloads during action of switch 2, and indicating instrument 59.

According to FIG. 5, the test medium is included in, i.e. becomes part of, the current path of the measuring circuit. This leads to particularly simple arrangements and may increase the measuring sensitivity.

In the construction shown in FIG. 5 the battery circuit 1, 2, 53 and the measuring device 57, 58, 59 are connected to a common measuring circuit consisting of conductors 54, 54' and medium 5, the latter serving as return path for the current. It may be useful sometimes to separate the battery circuit from the measuring device by utilizing two separate elongated conductors, parallel to, or crossing, each other, and to assign them to the battery circuit and measuring device respectively. This is shown in FIG. 6, where numerals and parts correspond to those of FIG. 5, apart from the now duplicated elongated conductors 64, and 64' and the accompanying return conductors 64' and 64''. It is also possible to provide either the battery circuit or the measuring device with a loop as shown in FIG. 1, and to provide the remaining circuit with an elongated conductor. This is shown in FIG. 7.

If the medium is solid or at least has a solid surface, the loops or conductors may be attached to this surface, either placed on it or held above it. If the medium is liquid, doughlike or powdery, the loops or conductors may be immersed or embedded within the medium.

The distinctive feature of the invention is the use of a primary magnetic field which is caused to decay very rapidly and which induces a secondary magnetic field within the medium to be examined, this secondary magnetic field decaying comparatively slowly, so that the great difference in time constants of the decay times permits, after some time, the separation of the signals in the receiver.

In an analogous way one can use the rise of the primary magnetic field for the measuring method according to the invention, since the rise of the primary magnetic field also induces a secondary magnetic field within the medium. The voltage induced by this secondary field within a receiving loop or elongated conductor has the same value as in the case of a decaying primary magnetic field, except with reversed polarity. Thus the graph of FIG. 2B remains valid, if the voltage scale is reversed.

It is to be understood that the above described arrangements are merely illustrative of the application of the principles of the invention. Numerous other arrangements may be devised by those skilled in the art without departing from the spirit and scope of the invention and are intended to be covered by the generic terms of the claims set forth below.

I claim:

1. Apparatus for investigating a generally homogeneous medium as to regions of anomalous electrical conductivity, comprising square-wave current supply means, inductive circuit means connected with said current supply means to be energized therefrom and adapted to be coupled with the medium for inducing abruptly rising and decaying primary magnetic field pulses in the medium, said primary field pulses inducing secondary field pulses in said medium, said primary field pulses being chosen to have decay times substantially shorter than the decay times of said secondary field pulses, a magnetic field pulse decay time measuring network having an input circuit coupled with said inductive circuit means and having instrument means for measuring substantially the decay times of the secondary field pulses induced in the medium by the primary field pulses, said network comprising time delay periodic switch means responsive to signal intensity in said network input circuit for controlling said instrument means to commence said secondary field-pulse decay time measuring substantially upon termination of a primary pulse, whereby said instrument means respond substantially only to the decay times of said secondary field pulses.

2. In apparatus according to claim 1, said switch means comprising two circuit leads between said inductive circuit means and said instrument means, a diode connected across said two leads, and a resistor connected in one of said leads serially between said diode and said loop means.

3. In apparatus according to claim 1, said inductive circuit means comprising a primary loop in inductive proximity of the medium, when in operation, and said network input circuit having a secondary loop insulated from said primary loop and likewise in inductive proximity of the medium when in operation.

4. In apparatus according to claim 1, said inductive circuit means comprising a loop member in inductive proximity of the medium, when in operation, and said network input circuit being also connected to said loop member.

5. The method of investigating a given generally homogeneous medium as to regions of anomalous electrical conductivity comprising the steps of subjecting said medium to substantially rectangular primary magnetic field pulses, said primary pulses being chosen to have rise and decay times which are considerably shorter than the respective total durations of said pulses, and to have pulse repetition intervals considerably longer than said rise and decay times, to induce in said medium secondary magnetic field pulses having rise times occurring substantially during the decay times of said primary magnetic pulses and having decay times occurring substantially during said intervals, said secondary magnetic field pulses having configurations in accordance with the electrical conductivity nature of said medium, measuring the respective decay times of said secondary magnetic field pulses substantially from the points of terminations of said primary magnetic pulses decay times, and comparing said measured secondary magnetic field pulse decay times with the corresponding decay times of secondary magnetic field pulses induced by said primary magnetic field pulses in said given absolutely homogeneous medium.

References Cited by the Examiner
UNITED STATES PATENTS

| | | | |
|---|---|---|---|
| 2,735,980 | 2/1956 | Wait | 324—7 |
| 3,090,910 | 5/1963 | Moran | 324—40 |
| 3,234,458 | 2/1966 | Bean et al. | 324—40 |

WALTER L. CARLSON, *Primary Examiner.*

RICHARD B. WILKINSON, *Examiner.*

R. J. CORCORAN, *Assistant Examiner.*